(12) United States Patent
Toriyama

(10) Patent No.: US 8,520,011 B2
(45) Date of Patent: Aug. 27, 2013

(54) IMAGE PROCESSING APPARATUS AND IMAGE PROCESSING METHOD

(75) Inventor: Yoshiaki Toriyama, Ebina (JP)

(73) Assignee: Ricoh Company, Limited, Tokyo (JP)

( * ) Notice: Subject to any disclaimer, the term of this patent is extended or adjusted under 35 U.S.C. 154(b) by 966 days.

(21) Appl. No.: 12/492,628

(22) Filed: Jun. 26, 2009

(65) Prior Publication Data

US 2009/0322958 A1 Dec. 31, 2009

(30) Foreign Application Priority Data

Jun. 27, 2008 (JP) ................................. 2008-168507

(51) Int. Cl.
*G06F 15/16* (2006.01)
*G06F 13/00* (2006.01)

(52) U.S. Cl.
USPC ............................ 345/502; 345/536; 345/537

(58) Field of Classification Search
USPC ................. 345/501, 502, 530, 536, 537, 555, 345/556
See application file for complete search history.

(56) References Cited

U.S. PATENT DOCUMENTS

| | | | | |
|---|---|---|---|---|
| 5,509,134 A * | 4/1996 | Fandrich et al. | ............... | 711/103 |
| 5,913,058 A * | 6/1999 | Bonola | ............................. | 713/2 |
| 6,643,690 B2 * | 11/2003 | Duursma et al. | ............... | 709/217 |
| 7,054,649 B2 * | 5/2006 | Yamazaki et al. | .......... | 455/456.3 |
| 7,450,164 B2 * | 11/2008 | Miyashita | ................. | 348/231.99 |
| 7,519,781 B1 * | 4/2009 | Wilt | ............................... | 711/154 |
| 2003/0023958 A1 * | 1/2003 | Patel et al. | ..................... | 717/146 |
| 2007/0094664 A1 * | 4/2007 | So et al. | .......................... | 718/103 |
| 2008/0030510 A1 * | 2/2008 | Wan et al. | ...................... | 345/505 |

FOREIGN PATENT DOCUMENTS

| | | |
|---|---|---|
| JP | 2005-189507 | 7/2005 |
| JP | 4016974 | 9/2007 |
| JP | 2007-301765 | 11/2007 |

* cited by examiner

*Primary Examiner* — Joni Richer
(74) *Attorney, Agent, or Firm* — Oblon, Spivak, McClelland, Maier & Neustadt, L.L.P.

(57) ABSTRACT

An image processing apparatus capable of providing a plurality of image processing functions includes: a first controller to execute and control a plurality of application programs; and a second controller to execute and control a part of the plurality of application programs. When the power of the image processing apparatus is turned on, the second controller completes the execution of the part of the plurality of application programs before the execution of the plurality of application programs by the first controller completes, and causes a part of the plurality of image processing functions provided by the part of the application programs executed by the second controller to be available for use by a user before the plurality of image processing functions becomes available for use by the user.

19 Claims, 8 Drawing Sheets

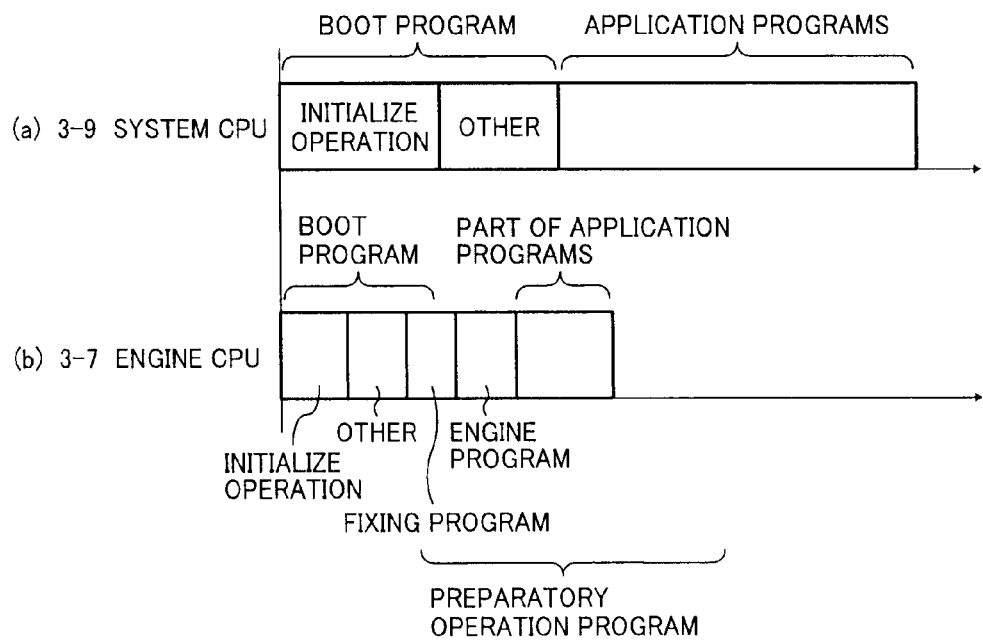

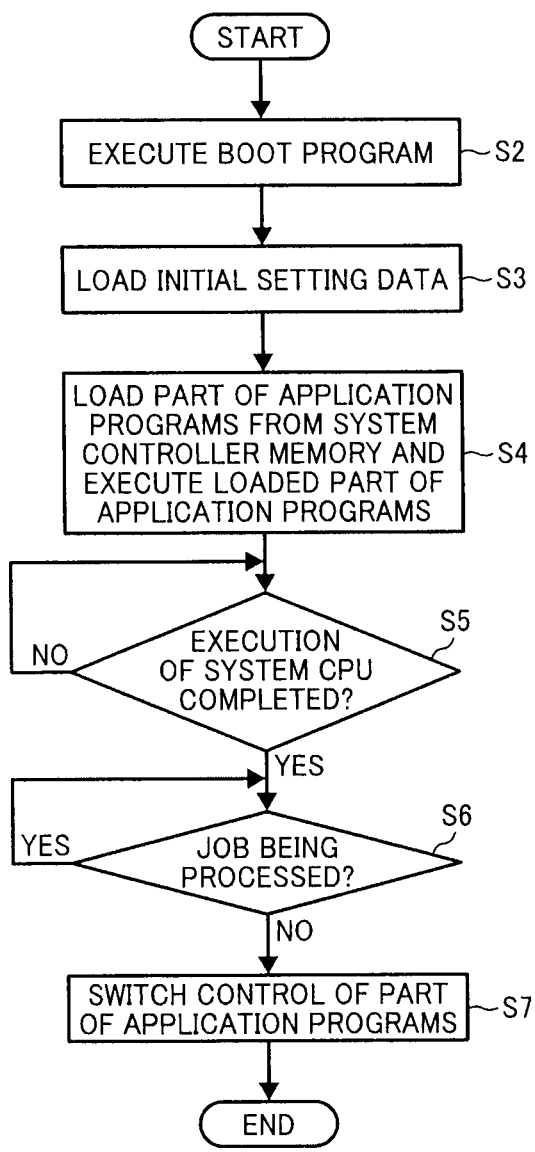

IMAGE PROCESSING APPARATUS AND IMAGE PROCESSING METHOD

CROSS-REFERENCE TO RELATED APPLICATIONS

This patent application is based on and claims priority under 35 U.S.C. §119 to Japanese Patent Application No. 2008-168507, filed on Jun. 27, 2008, in the Japanese Patent Office, the disclosure of which is hereby incorporated herein by reference.

FIELD OF THE INVENTION

The present invention generally relates to an apparatus and method for image processing, and more specifically to an apparatus and method for image processing capable of providing a plurality of image processing functions.

BACKGROUND

While the recent image forming apparatus is capable of providing a wide variety of image processing functions with high capability, the time required for staring up the image forming apparatus such as to execute all the application programs capable of providing the image processing functions tends to be longer, thus requiring the user to wait for the longer time until the user can use the image forming apparatus.

In order to reduce the time for staring up the image forming apparatus, the Japanese Patent Application Publication No. 2005-189507 discloses an image forming apparatus, which includes a sub CPU, an engine CPU, and a system CPU. The execution of the sub CPU is completed before the execution of the engine CPU and the system CPU. The sub CPU controls the image fixing operation of the fixing device to reduce the time required for the image forming apparatus to be in the state in which the image fixing operation is available after the time when the power is turned on.

However, the image forming apparatus disclosed in the Japanese Patent Application Publication No. 2005-189507 can perform the image forming operation only after the execution of the system CPU has completed. While the fixing device is caused to be in the state where the image fixing operation is available at the reduced time, the image forming operation is not performed unless the execution of the system CPU has completed. When the time required for the system CPU to execute increases, the time required for the image forming apparatus to be ready for image forming operation may also increase.

Further, the user at the image forming apparatus may not need to use the image forming function, but may only desire to use only a part of the image processing functions provided by the image forming apparatus. Even when the user only desires to use the part of the image processing functions that requires no image forming, such image processing function cannot be made available for use by the user until the execution of the system CPU has completed.

SUMMARY

Example embodiments of the present invention include an image processing apparatus capable of providing a plurality of image processing functions, which includes: a first controller memory to store a plurality of application programs each providing at least a part of the plurality of image processing functions of the image processing apparatus; a first controller to control the first controller memory and to execute and control the plurality of application programs stored in the first controller memory; and a second controller to execute and control a part of the plurality of application programs which is previously selected from the plurality of application programs stored in the first controller memory. When the power of the image processing apparatus is turned on, the second controller completes the execution of the part of the plurality of application programs before the execution of the plurality of application programs by the first controller completes, and causes a part of the plurality of image processing functions provided by the part of the application programs executed by the second controller to be available for use by a user before the plurality of image processing functions becomes available for use by the user.

In addition to the above-described example embodiments, the present invention may be practiced in various other ways, for example, as an image processing system, a method of controlling an image processing apparatus, or a recording medium storing a plurality of instructions which cause a computer to perform a method of controlling an image processing apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is a timing chart illustrating the time required for executing a system CPU and an engine CPU of the image forming apparatus of FIG. 1;

FIG. 4 is an illustration for explaining an example data structure of a parameter memory of the image forming apparatus of FIG. 1;

FIG. 5 is a flowchart illustrating operation of starting up the image forming apparatus of FIG. 1 after the power is turned on, performed by the engine CPU of the image forming apparatus of FIG. 1, according to an example embodiment of the present invention;

Figure 1:
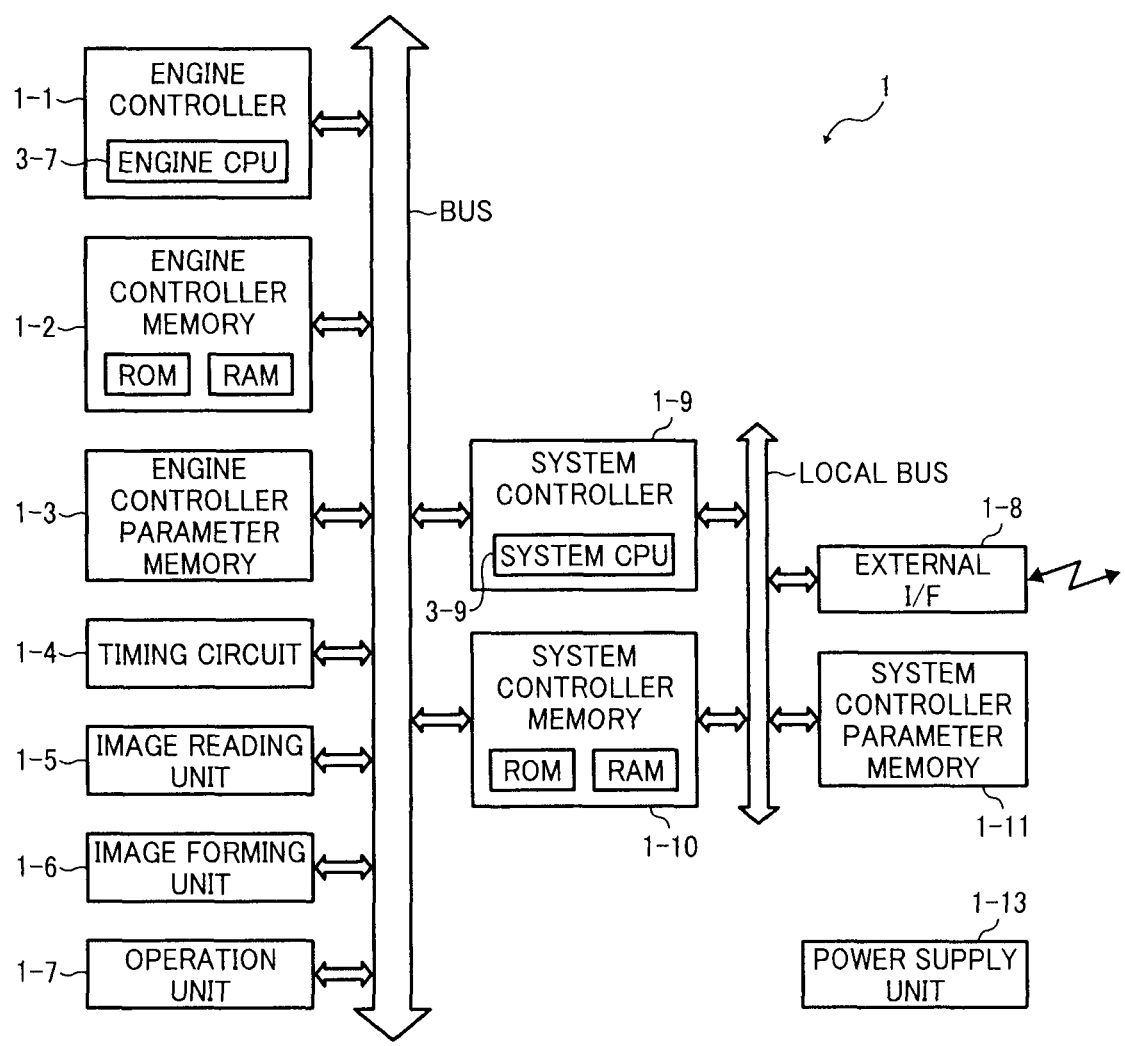
FIG. 1 is a schematic block diagram illustrating an internal structure of an image forming apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a function of an image forming apparatus 1 is explained according to an example embodiment of the present invention. The image forming apparatus 1 provides a plurality of image processing functions including, for example, copying, scanning, fax communication, data communication, and printing.

The image forming apparatus 1 includes a system controller 1-9, which functions as a first controller that executes and controls a plurality of application programs each capable of performing one of the plurality of image processing functions. The image forming apparatus 1 further includes an engine controller 1-1, which functions as a second controller that executes and controls a preparatory operation program, which controls a preparatory operation that causes at least a part of the plurality of image processing functions to be available for use by the user at the time of starting up the image forming apparatus 1. The preparatory operation program may be implemented by an image fixing operation program, an engine program, etc. In addition to the preparatory operation program, the engine controller 1-1 functioning as the second controller may execute a part of the plurality of application programs, which is to be executed by the system controller 1-9 functioning as the first controller. This allows the user to use a part of the image processing functions that is provided by the part of the application programs that is executed by the engine controller 1-1 even before the system controller 1-9 completes the execution of the plurality of application programs.

More specifically, the image forming apparatus 1 of FIG. 1 causes the part of the plurality of application programs to be executed by the system controller 1-9 to be available for use as long as the execution of such part of the application programs is completed by the engine controller 1-1, without waiting for the system controller 1-9 to complete the execution of all of the plurality of application programs. This allows the user to use the part of the plurality of image processing functions, which is provided by the part of the application programs that is executed by the engine controller 1-1.

<Internal Structure of an Image Forming Apparatus>

Referring now to FIG. 1, a structure of the image forming apparatus 1 is explained according to an example embodiment of the present invention.

The image forming apparatus 1 of FIG. 1 includes the engine controller 1-1, an engine memory 1-2, an engine controller parameter memory 1-3, a timing circuit 1-4, an image reading unit 1-5, an image forming unit 1-6, an operation unit 1-7, an external interface (I/F) 1-8, a system controller 1-9, a system controller memory 1-10, a system controller parameter memory 1-11, and an electric power supply unit 1-13.

The engine controller 1-1, which includes an engine central processing unit (CPU) 3-7, controls an engine of the image forming apparatus 1 that is provided to control the mechanical operation related to image processing. For example, the engine CPU 3-7 may control the mechanical operation of the image forming unit 1-6 such as an image fixing device, an image forming device, etc. In another example, the engine CPU 3-7 may control the mechanical operation of the image reading unit 1-5. The engine controller 1-1 may perform a plurality of operations including controlling I/O load, controlling image fixing operation, controlling I/F with a peripheral device, controlling I/F with the system controller 1-9, controlling the preparatory operation program, and controlling at least a part of the application programs that is previously selected from a plurality of application programs to be executed by the system controller 1-9. In this example, the preparatory operation program controls the preparatory operation, which causes at least a part of the image processing functions such as copying, scanning, faxing, and printing to be available for use at the time of starting up the image forming apparatus 1. The preparatory operation program includes, for example, the image fixing operation program for controlling the image fixing operation, and the engine control program for controlling the engine.

The engine controller memory 1-2 is a memory, which is used by the engine controller 1-1. As illustrated in FIG. 1, the engine controller memory 1-2 may be implemented by a read only memory (ROM) and a random access memory (RAM). The ROM stores data to be used by the engine controller 1-1, which may be needed to execute a program, such as the part of the application programs. The RAM may function as a work area of the engine controller 1-1.

The engine controller parameter memory 1-3 is a parameter memory to be used by the engine controller 1-1, and stores information specific to the image forming apparatus 1.

The timing circuit 1-4 obtains current time information indicating the current time, or may obtain a counted time value such that it may be used as a timer.

The image reading unit 1-5 reads an image, which may be provided to the image forming apparatus 1, into image data. The image reading unit 1-5 may be implemented by a scanner of any desired type. For example, the scanner may be provided with an automatic document feeder (ADF).

The image forming unit 1-6 forms a printed image on a recording sheet based on the image data, which may be obtained through the image reading unit 1-5 or any other device of the image forming apparatus 1. The image forming unit 16 may be implemented by an image forming device such as a photoconductor device, a charging device, an image developing device, and a transfer device. The image forming unit 16 additionally includes an image fixing device, which fixes the image formed by the image forming device onto the recording sheet, for example, by heat and pressure.

The operation unit 1-7 allows the user to operate the image forming apparatus 1 to use various functions through an input device that receives a user instruction. Alternatively, the operation unit 1-7 may display various information to the user through a display device to display information that may be useful to the user for operating or status information indicating the status of the image forming apparatus 1. The operation unit 1-7 may be implemented by a liquid crystal display (LCD) with a touch-panel screen. Alternatively or additionally, the operation unit 1-7 may be implemented by a speaker, a microphone, various keys or buttons, etc.

The external I/F 1-8 connects the image forming apparatus 1 to a network or an external device, such as a public switched telephone network (PSTN), a local area network (LAN), a universal serial bus (USB) device, a hard disk drive (HDD), etc. to exchange data. For example, the through the external I/F 1-8, the image forming apparatus 1 is able to communicate with the other apparatus to provide fax communication or data communication.

The system controller 1-9, which includes a system CPU 3-9, controls entire operation of the image forming apparatus 1. In this example, the system controller 1-9 performs a plurality of operations including controlling image processing, controlling I/F with a peripheral device, controlling I/F with the engine controller 1-1, and controlling the plurality of application programs.

The system controller memory 1-10 is a memory to be used by the system controller 1-9, and may include a ROM and a RAM. The ROM stores data to be used by the system controller 1-9 for executing a program such as the plurality of application programs. The RAM may function as a work area of the system controller 1-9.

The system parameter memory 1-11 is a parameter memory to be used by the system controller 1-9, and stores information specific to the image forming apparatus 1.

The image forming apparatus 1 further includes the electric power supply unit 1-13, which supplies electric power to each of the units in the image forming apparatus 1. For example, when the user presses a power switch, which may be provided with the operation unit 1-7, the electric power supply unit 1-13 supplies the electric power to cause the image forming apparatus 1 to start up the image forming apparatus 1.

<Operation of Starting up the Image Forming Apparatus>

Figure 2:
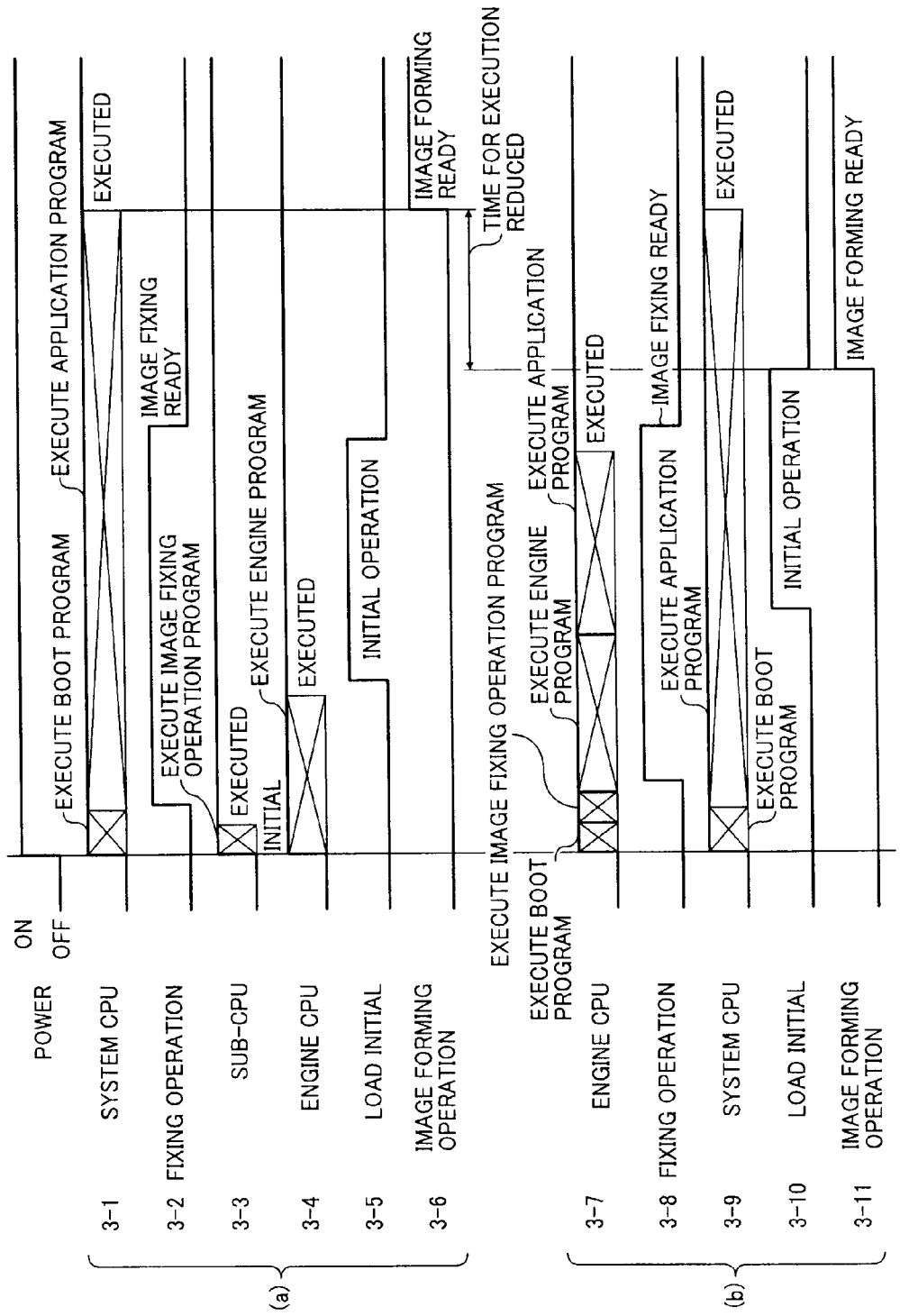
FIG. 2 is a timing chart illustrating operation of starting up the image forming apparatus of FIG. 1 after the power is turned on in comparison with operation of starting up a background image forming apparatus.

Referring now to FIG. 2, operation of starting up the image forming apparatus 1 is explained according to an example embodiment of the present invention. When the power is turned on, for example, by the user through the operation unit 1-7, the image forming apparatus 1 executes the application programs to cause the image processing functions to be available for use. For the descriptive purpose, FIG. 2 additionally illustrates an example case of operation of starting up a background image forming apparatus using a background technology. More specifically, FIG. 2(*a*) illustrates the example case of stating up operation performed by the background image forming apparatus. FIG. 2(*b*) illustrates the example case of starting up operation performed by the image forming apparatus 1 of FIG. 1. The horizontal axis in FIG. 2 indicates the time counted from the time when the power is turned on for both cases of FIGS. 2(*a*) and 2(*b*).

As illustrated in FIG. 2(*a*), when the power is turned on for the background image forming apparatus, a system CPU 3-1, a sub CPU 3-3, and an engine CPU 3-4 are respectively executed. The system CPU 3-1 executes a boot program, which causes execution of a plurality of application programs controlled by the system CPU 3-1. The sub CPU 3-3 executes an image fixing operation program for controlling the image fixing operation performed by an image fixing device of the image forming unit 1-6. The engine CPU 3-4 executes an engine program for controlling an engine for controlling the mechanical operation related to image processing.

When execution of the boot program completes, the system CPU 3-1 starts execution of the plurality of application programs, which are controlled by the system CPU 3-1 and provide various image processing functions. When execution of the image fixing operation program completes, the sub CPU 3-3 starts operation of controlling image fixing operation 3-2. When execution of the engine program completes, the engine CPU 3-4 starts operation of controlling a load initial 3-5. The control of the load initial 3-5 may be performed for any unit provided in the background image forming apparatus such as an engine control unit or an auto document feeder (ADF). The engine CPU 3-4 overtakes the operation of controlling the image fixing operation 3-2, which is executed by the sub CPU 3-3. When a temperature of an image fixing device of the background image forming apparatus reaches a predetermined fixing temperature suitable for image fixing, the operation of controlling the image fixing operation 3-2 moves to a phase where the image fixing operation is ready.

When execution of the application programs controlled by the system CPU 3-1 completes, the system CPU 3-1 determines whether the operation of controlling the image fixing operation 3-2 is in the phase in which the image fixing operation is ready. The system CPU 3-1 further determines whether the load initial 3-5 has completed. When it is determined that the operation of controlling the image fixing operation 3-2 is in the phase in which the image fixing operation is ready, and that the load initial 3-5 has completed, the system CPU 3-1 determines that the operation of image forming 3-6 is in the phase where the image forming operation is ready. The system CPU 3-1 causes the plurality of image processing functions that are provided by the application programs controlled by the CPU 3-1 to be available for use by the user. By performing the operation as described above referring to FIG. 2(*a*), the background image forming apparatus allows the user to use the plurality of image processing functions that are provided by the application programs.

The above-described operation of FIG. 2(*a*) has a drawback. For example, even when the operation of controlling the image fixing operation 3-2 is in the phase where the image fixing operation is ready, or even when the load initial 3-5 has completed, unless the application programs controlled by the CPU 3-1 are all executed, the operation of image forming 3-6 does not proceed to the phase where the image forming operation is ready. More specifically, when execution of the application programs is delayed, the operation of image forming 3-6 is delayed, thus causing the delay in providing the plurality of image processing functions to the user.

In order to reduce the time that is required for starting up, the image forming apparatus 1 of FIG. 1 operates as described below referring to FIG. 2(*b*).

As illustrated in FIG. 2(*b*), when the power is turned on, the system CPU 3-9 and the engine CPU 3-7 each start execution. The system CPU 3-9 executes a boot program for executing the application programs controlled by the CPU 3-9. The engine CPU 3-7 executes a boot program for executing the program controlled by the engine CPU 3-7.

When the boot program is executed, the system CPU 3-9 starts executing the plurality of application programs. When the boot program is executed, the engine CPU 3-7 starts executing the image fixing operation program for controlling the image fixing operation, the engine program for controlling the engine, and a part of the application programs that is previously selected from the plurality of application programs that are controlled and executed by the system CPU 3-9. When execution of the image fixing operation program completes, the engine CPU 3-7 starts operation of controlling the image fixing operation 3-8. When execution of the engine program completes, the engine CPU 37 starts operation of controlling a load initial 3-10 for the engine controller, the ADF, etc.

Referring to FIG. 2(b), the engine CPU 3-7 is caused to execute in the order of the image fixing operation program, the engine program, and the part of the application programs. Alternatively, the engine CPU 3-7 may concurrently execute the image fixing operation program, the engine program, and the part of the application programs. Further, the engine CPU 3-7 may concurrently perform operation of execution of the part of the application programs, operation of controlling the image fixing operation 3-8, and operation of controlling the load initial 3-10. When execution of the part of the application programs performed by the engine CPU 3-7 completes, the engine CPU 3-7 determines whether the operation of controlling the image fixing operation 3-8 is in the phase where the image fixing operation is ready. The engine CPU 3-7 further determines whether the load initial 3-10 has been completed. When it is determined that the operation of controlling the image fixing operation 3-8 is in the phase in which the image fixing operation is ready, and that the load initial 3-10 has completed, the engine CPU 3-7 determines that the operation of image forming 3-11 should be proceed to the phrase where the image forming operation is ready. The engine CPU 3-7 causes the part of the plurality of image processing functions that is provided by the part of the plurality of application pograms executed by the engine CPU 3-7 to be available for use by the user.

As described above referring to FIG. 2(b), the image forming apparatus 1 causes the engine CPU 3-7 to execute the part of the plurality of application programs, which is selected from the plurality of application programs to be executed by the system CPU 3-9. When execution of the part of the application programs completes, the engine CPU 3-7 causes the operation of controlling the image fixing operation 3-8 to be moved to the phase in which the image fixing operation is ready. Further, when it is determined that the load initial 3-10 has completed, the engine CPU 3-7 causes the operation of image forming 3-11 to be moved to the phase in which the image forming operation is ready. In comparison with the example case of the background image forming apparatus illustrated in FIG. 2(a), the image forming apparatus 1 of FIG. 2(b) causes the image forming apparatus 1 to be in the phase in which the image forming is ready with the reduced time.

As described above referring to FIG. 2(b), the user does not have to wait for the system CPU 3-9 to execute all of the application programs. As long as execution of the part of the application programs executed by the engine CPU 3-7 has completed, the user may use the part of the image processing functions provided by the part of the application programs executed by the engine CPU 3-7. The part of the plurality of image processing functions provided by the part of the application programs executed by the engine CPU 3-7 may be given priority for being firstly available for use by the user when the power is turned on. For example, the image forming apparatus 1 may notify the user the availability of the part of the image processing functions through the operation unit 1-7 to allow the user to input a user instruction for performing an image processing job that relates to the part of the image processing functions through the operation unit 1-7. Alternatively, the image forming apparatus 1 may notify the user the availability of the part of the image processing functions through the external I/F 1-8 to allow the user to input a user instruction for performing an image processing job that relates to the part of the image processing functions trough any device or apparatus remove from the image forming apparatus 1. The operation unit 1-7 and the external I/F 1-8 may be collectively referred to as a user interface.

In order to make the part of the application programs firstly available to the user, alternatively, a part of the image processing functions provided by a part of the application programs executed by the system CPU 3-9 may be made available to the user when the execution of the part of the application programs has completed by the system CPU 3-9. However, the time required for the image forming apparatus 1 to start up may not be sufficiently reduced when the processing functions to be controlled by the system CPU 3-9 are considered as described below.

Since the system CPU 3-9 controls the entire operation of the image forming apparatus 1, as illustrated in FIG. 3(a), the time for initializing the boot program, which is performed before execution of the application programs, usually takes longer when compared with the time for initializing the boot program for the engine CPU 3-7. In this example, the initialization may include checking a memory space, etc. Accordingly, the time required for the system CPU 3-9 to make the part of the application programs available for use by the user could be longer than the time required for the engine CPU 3-9 to make the part of the application programs available for use by the user.

Further, assuming that the user instructs the image forming apparatus 1 to perform the part of the image processing functions provided by the part of the application programs executed by the system CPU 3-9 while execution of the other part of the application programs is being performed by the system CPU 3-9, the system CPU 3-9 is required to concurrently perform operation of controlling the image processing function instructed by the user, and operation of executing the other part of the application programs. This may cause the processing speed of executing the other part of the application programs to slow down, resulting in the longer time for completing execution of the application programs.

In view of the above, in this example, the engine CPU 3-7, which has the processing functions less than that of the system CPU 3-9, is caused to execute the part of the application programs that is selected from the application programs to be executed by the system CPU 3-9. When the part of the application programs has been executed by the engine CPU 3-7, the part of the image processing functions provided by the part of the application programs executed by the engine CPU 3-7 is made available for use by the user. This allows the image forming apparatus 1 to firstly provide the part of the image processing functions to the user, while still allowing the system CPU 3-9 to continue controlling the execution of the application programs.

In this example, the engine CPU 3-7 does not control the entire operation of the image forming apparatus 1, but only a part of the entire operation performed by the image forming apparatus 1. As illustrated in FIG. 3(b), the time required for the engine CPU 3-7 to complete initialization is less than the time required for the system CPU 3-9 to complete initialization. Accordingly, by causing the engine CPU 3-7 to control execution of the part of the application programs to be made firstly available for use, the time required for the image forming apparatus 1 to provide the part of the image processing functions executed by the part of the application programs is reduced when compared with the above-described example case of causing the system CPU 3-9 to control execution of the part of the application programs.

In this example, the engine CPU 3-7 executes the preparatory operation program, and controls the preparatory operation program after execution. The preparatory operation program is used for controlling the preparatory operation, which causes the image processing functions, such as copying, scanning, faxing, and printing, to be available for use, including, for example, the load initial operation for each unit, image fixing operation, etc. For example, the preparatory operation program may include the image fixing operation program and the engine program. However, the processing functions or activities to be performed by the engine CPU 3-7 is less than that of the system CPU 3-9 such that, even when execution of the part of the application programs is performed in addition to execution of the preparatory operation program, the time required for the engine CPU 3-7 to complete execution of the part of the application programs is still less than the time required for the system engine CPU 3-9 to complete execution of the part of the application programs as illustrated in FIG. 3(*b*). By causing the engine CPU 3-7 to execute the part of the application programs, the image forming apparatus 1 is able to make the part of the image processing functions that is executed by the part of the application programs executed by the engine CPU 3-9 to be firstly available for use by the user at the time of starting up the image forming apparatus 1.

<Data Structure of Parameter Memory>

Referring now to FIG. 4, an example data structure of each of the parameter memory 1-3 and the parameter memory 1-11 is explained according to an example embodiment of the present invention. Since the parameter memory 1-3 and the parameter memory 1-11 are each assumed to have the data structure illustrated in FIG. 4 in this example, the parameter memory 1-3 and the parameter memory 1-11 may be collectively referred to as the parameter memory.

As illustrated in FIG. 4, the parameter memory includes machine specific data, initial setting data, counter data, and history data. The data stored in the parameter memory is not deleted even when the power of the image forming apparatus 1 is turned off.

The machine specific data corresponds to unique information, which is used for identifying the image forming apparatus 1, for example, a serial number previously assigned to the image forming apparatus 1.

The initial setting data corresponds to any data indicating the initial state of the image forming apparatus 1 including, for example, registration adjustment information, distributed area information, language information, application identification information, etc.

The registration adjustment information is any information used for adjusting the registration of the image forming apparatus 1. The distributed area information is any information used to set the location to which the image forming apparatus 1 is distributed. The language information is any information used to set the language to be used by the image forming apparatus 1 when displaying various information to the user through the operation unit 1-7.

The application identification information is used to identify which of the application programs is to be executed by the engine CPU 3-7 before being executed by the system CPU 3-9. The application identification information may be implemented by flag information, which is indicated by a bit sequence number of 1 and 0 and may be stored with respect to each one of the application programs. Further, the application identification information may be caused to include the order of executing the corresponding application program. Based on this application identification information, the engine CPU 3-7 or the system CPU 3-9 may determine the order of executing the application programs.

In this example, the engine controller parameter memory 1-3 stores the application identification information for identifying the application programs to be executed by the engine CPU 3-7. The system controller parameter memory 1-11 stores the application identification information for identifying the application programs to be executed by the engine CPU 3-7 and the application programs to be executed by the system CPU 3-9.

The counter data is any information obtained when one of the image processing functions of the image forming apparatus 1 is used. Examples of the counter data include, but not limited to, the copy counter information obtained when the copy function is used, the scanner counter information obtained when the scanner function is used, the fax communication counter information obtained when the fax communication function is used, the data communication counter information obtained when the data communication function is used, and the printer counter information when the print function is used. Alternatively, the counter data may specify the number of using the image processing functions of the image forming apparatus 1.

The history data is any information indicating the usage history of the image forming apparatus 1 including, for example, error information, used application information, etc. The error information may be used to obtain information regarding the occurrence of error observed in the image forming apparatus 1. The used application information may be used to obtain information regarding the usage of the application program provided in the image forming apparatus 1, for example, how many times each of the application programs is used by the user.

For the descriptive purpose, the counter data and the history data may be collectively referred to as usage information, which indicates the result of performing at least one of the image processing functions provided by the image forming apparatus 1.

<Operation Performed by Engine CPU>

Referring to FIG. 5, operation of executing a part of the application programs performed by the engine CPU 3-7 is explained according to an example embodiment of the present invention. In this example, it is assumed that the engine CPU 3-7 loads the part of the application programs stored in the system controller memory 1-10, according to the application identification information stored in the engine controller parameter memory 1-3.

When the power of the image forming apparatus is turned on, at S2, the engine CPU 3-7 loads the boot program from the engine controller memory 1-2, and executes the loaded boot program.

When execution of the boot program completes, at S3, the engine CPU 3-7 loads the initial setting data stored in the engine controller parameter memory 1-3. The engine CPU 3-7 executes the image fixing operation program, and the engine program from the ROM of the engine controller memory 1-2, and executes the image fixing operation program and the engine program each loaded.

At S4, the engine CPU 3-7 obtains the application identification information included in the initial setting data, and accesses the system controller memory 1-10 to load the part of the application programs that corresponds to the application identification information from the ROM of the system controller memory 1-10. The engine CPU 3-7 executes the part of the application programs that is loaded from the ROM of the system controller memory 1-10. In this example, the part of the application programs to be executed by the engine CPU 3-7 may be any desired number of application programs selected from the plurality of application programs to be executed by the system CPU 3-9.

Further, when the image fixing operation program and the engine program are each executed, the engine CPU 3-7 controls initial setting of the image forming apparatus 1 according to the registration adjust information, distributed area information, and language information, each included in the initial setting data. Examples of the initial setting operation include, but not limited to, controlling of a driving operation performed by a driving unit, an image reading operation performed by the image reading unit 1-5, an image forming operation performed by the image forming unit 1-6, and operating operation performed by the operation unit 1-7. When the initial setting operation has completed, at least a part of the image processing functions such as copying, scanning, faxing, data communication, and printing may be made available for use by the user. More specifically, when execution of the part of the application programs that has been loaded from the ROM of the system controller memory 1-10 is completed, the engine CPU 3-7 causes a part of the image processing functions provided by the part of the application programs that has been loaded to be available for use by the user. The engine CPU 3-7 causes a part of the image processing functions provided by the part of the application programs to be firstly available for user by the user.

At S5, the engine CPU 3-7 determines whether execution of the application programs by the system CPU 3-9 has been completed using any desired method.

In one example, when execution of the application programs has been completed, the system CPU 3-9 sends a request for switching control of the part of the application programs that is executed by the engine CPU 3-7 from the engine CPU 3-7 to the system CPU 3-9, to the engine CPU 3-7. When the request for switch control is received, the engine CPU 3-7 determines that execution of the application programs has been completed. Thus, the engine CPU 3-7 determines whether execution of the application programs has completed by the system CPU 3-9 based on whether the request for switch control is received from the system CPU 3-9.

In another example, the engine CPU 3-7 monitors the system CPU 3-9, and determines whether execution of the application programs by the system CPU 3-9 has completed. The engine CPU 3-7 determines whether execution of the application programs by the system CPU 3-9 has completed based on the result of monitoring.

When the engine CPU 3-7 determines that execution of the application programs by the system CPU 3-9 is completed ("YES" at S5), the operation proceeds to S6 to determine whether there is any image processing job that is being processed by the part of the application programs executed by the engine CPU 3-7.

When the engine CPU 3-7 determines that the image processing job is being processed by the part of the application programs executed by the engine CPU 3-7 ("YES" at S6), the operation repeats S6 to wait until the image processing job that is being performed completes. When the engine CPU 3-7 determines that the image processing job is not being processed by the part of the application programs executed by the engine CPU 3-7 ("NO" at S6), the operation proceeds to S7 to switch control of the part of the application programs executed by the engine CPU 3-7 from the engine CPU 3-7 to the system CPU 3-9, for example, using the following method.

In one example, when execution of the application programs completes by the system CPU 3-9, the system CPU 3-9 sends a request for switch control to the engine CPU 3-7, which requests for control of the part of the application programs executed by the engine CPU 3-7 to switch from the engine CPU 3-7 to the system CPU 3-9. When the request for switch control is received from the system CPU 3-9, the engine CPU 3-7 determines that execution of the application programs by the system CPU 3-9 has completed ("YES" at S5). When the engine CPU 3-7 determines that no image processing job that is provided by the part of the application programs executed by the engine CPU 3-7 is performed ("NO" at S6), the operation proceeds to S7 to cause the engine CPU 3-7 to stop controlling of the part of the application programs executed by the engine CPU 3-7. The engine CPU 3-7 sends a response to the request for switch control, which is received from the system CPU 3-9, to the system CPU 3-9. When the response is received from the engine CPU 3-7, the system CPU 3-9 takes over control of the part of the application programs executed by the engine CPU 3-7 from the engine CPU 3-7. The system CPU 3-9 is thus caused to control the plurality of application programs including the part of application programs executed by the engine CPU 3-7. With this function, the control of the part of the application programs, which is executed by the engine CPU 3-7, may be taken over by the system CPU 3-9 relatively smoothly.

In another example, the engine CPU 3-7 monitors the system CPU 3-9, and determines whether execution of the application programs executed by the system CPU 3-9 has completed. When the engine CPU 37 determines that execution of the application programs executed by the system CPU 3-9 has completed ("YES" at S5), at S6, the engine CPU 3-7 determines whether any image processing job is being processed by the part of the application programs executed by the engine CPU 3-7. When the engine CPU 3-7 determines that no image processing job is being processed by the part of the application programs executed by the engine CPU 3-7 ("NO" at S6), the operation proceeds to S7 to stop control of the part of the application programs executed by the engine CPU 3-7. The engine CPU 3-7 sends a request for switch control to the system CPU 3-9, which requests switch of control of the part of the application programs executed by the engine CPU 3-7 from the engine CPU 3-7 to the system CPU 3-9. When the system CPU 3-9 receives the request for switch control from the engine CPU 3-7, the system CPU 3-9 takes over control of the part of the application programs executed by the engine CPU 3-7 from the engine CPU 3-7. The system CPU 3-9 is thus caused to control the plurality of application programs including the part of the application programs executed by the engine CPU 3-7. With this function, the control of the part of the application programs executed by the engine CPU 3-7 may be taken over by the system CPU 3-9 relatively smoothly.

As described above referring to FIG. 5, the engine CPU 3-7 accesses the system controller memory 1-10 using the application identification information stored in the engine controller parameter memory 1-3. The engine CPU 3-7 loads the part of the application programs corresponding to the application identification information from the ROM of the system controller memory 1-10, and executes the loaded part of the application programs. When execution of the loaded part of the application programs completes, the engine CPU 3-7 makes the part of the image processing functions provided by the loaded part of the application programs to be available for use by the user. This allows the part of the image processing functions provided by the part of the application programs that has been executed to be available for use by the user as long as execution of the part of the application programs has been completed, without the need for waiting execution of the application programs by the system CPU 3-9 to complete. Thus, the engine CPU 3-7 allows the part of the image processing functions provided by the part of the application programs executed by the engine CPU 3-7 to be firstly available for use by the user.

When execution of the application programs by the system CPU 3-9 has completed, the engine CPU 3-7 may switch control of the part of the application programs from the engine CPU 3-7 to the system CPU 3-9. The system CPU 3-9 takes over control of the part of the application programs executed by the engine CPU 3-7 from the engine CPU 3-7. The system CPU 3-9 is thus cause to control the plurality of application programs including the part of the application programs executed by the engine CPU 3-7. More specifically, all of the application programs including the part of the application programs that are made firstly available for use by the engine CPU 3-7 are controlled by the system CPU 3-9.

When the image processing job is being processed by the part of the application programs executed by the engine CPU 3-7, the engine CPU 3-7 causes switch of control of the part of the application programs from the engine CPU 3-7 to the system CPU 3-9 after the image processing job completes. In this manner, control of the part of the application programs may be switched without affecting the image processing job.

In this example, the part of the application programs to be executed by the engine CPU 3-7 is preferably stored in the ROM of the system controller memory 1-10 in the form of raw data, or in the form interpretable by the engine CPU 3-7. Alternatively, in order to save the memory space, the part of the application programs may be stored in a compressed or encoded format. Alternatively, the part of the application programs to be executed by the engine CPU 3-7 may be stored in the ROM in the form of raw data, while the application programs to be executed by the system CPU 3-9 may be stored in the ROM in the form of compressed format.

When the part of the application programs is stored in the ROM of the system controller memory 1-10 in the compressed format, the engine CPU 3-7 loads the part of the application programs from the ROM of the system controller memory 1-10 onto the RAM of the engine controller memory 1-2, expands the part of the application programs onto the RAM of the engine controller memory 1-2, and executes the part of the application programs. At this time, the part of the application programs that is expanded may be stored in the ROM of the engine controller memory 1-2. When the part of the application programs is stored in the ROM of the system controller memory 1-10 in the uncompressed format, such expansion does not have to be performed before execution.

In this example, the engine CPU 3-7 executes the part of the application programs to be executed by the system CPU 3-9. In such case, the part of the application programs executed by the engine CPU 3-7 and the application programs executed by the system CPU 3-9 do not have to be in the same file format or in the same programming language. Preferably, the part of the application programs executed by the engine CPU 3-7 is written in the format that would reduce the time for execution.

<Setting of Part of Application Programs Executed by Engine CPU>

Figure 6:
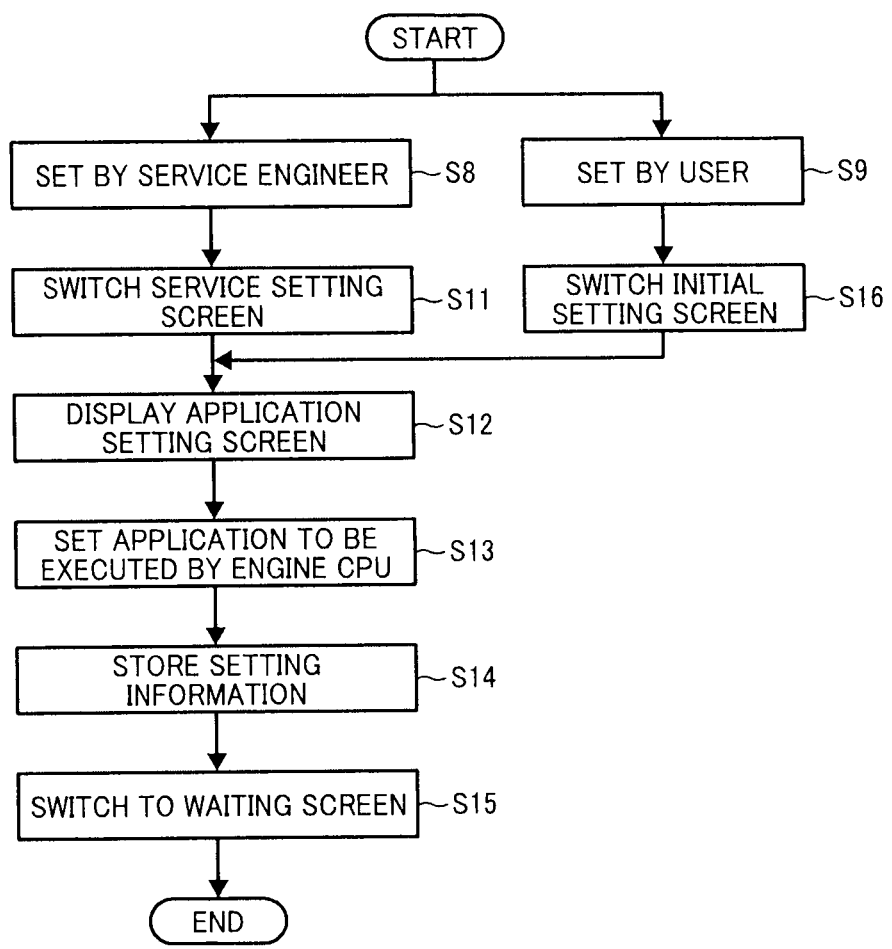
FIG. 6 is a flowchart illustrating operation of selecting a part of a plurality of application programs to be executed by the engine CPU of the image forming apparatus of FIG. 1, according to an example embodiment of the present invention.

Referring to FIG. 6, operation of selecting the part of the application programs to be executed by the engine CPU 3-7 is explained according to an example embodiment of the present invention.

In one example, a service engineer may set the selection of the part of the application programs to be executed by the engine CPU 3-7 at any desired time, for example, at the time of installing the image forming apparatus 1 at the user site. Once setting is performed by the service engineer, the user may modify settings set by the service engineer or may continuously use the settings set by the service engineer.

In the example case of having the application programs set by the service engineer and such settings are used continuously by the user, the operation proceeds to S11 to switch the display of the operation device 1-7 from a service setting screen to an application setting screen, and to S12 to display the application setting screen. In this example, the service setting screen is a screen displayed by the operation device 1-7, which allows the service engineer to input various information regarding the setting of the image forming apparatus 1. The application setting screen is a screen displayed by the operation device 1-7, which allows the service engineer, or the user, to input various information regarding the setting of the part of the application programs to be executed by the engine CPU 3-7.

At S13, through the application setting screen, the service engineer may determine the part of the application programs to be executed by the engine CPU 3-7, by inputting setting information regarding the part of the application programs to be executed by the engine CPU 3-7.

When the information regarding the setting of the part of the application programs is received through the operation device 1-7, at S14, the system CPU 3-9 stores the obtained setting information such as application identification information identifying the part of the application programs to be executed by the engine CPU 3-7 in the parameter memory 1-3 and the parameter memory 1-11. More specifically, the engine controller parameter memory 1-3 stores the application identification information for identifying each of the part of the application programs to be executed by the engine CPU 3-7. The system controller parameter memory 1-11 stores the application identification information for identifying each of the part of the application programs to be executed by the engine CPU 3-7, and the application identification information for identifying each of the application programs to be executed by the engine CPU 3-9. When the setting information is stored, the image forming apparatus 1 causes the part of the application programs to be executed by the engine CPU 3-7 according to the setting information.

At S15, when the setting is completed, the system CPU 3-9 switches the display of the operation device 1-7 to a waiting screen, and the operation ends.

In another example, when the part of the application programs to be executed by the engine CPU 3-7 is set by the user preferably after the service engineer has set, the operation proceeds to S16 to switch the display of the operation device 1-7 from the initial setting screen to the application setting screen, and to S12 to display the application setting screen. In this example, the initial setting screen is a screen displayed by the operation device 1-7 to allow the user to input various setting information regarding the image forming apparatus 1. As described above, the application setting screen is a screen displayed by the operation device 1-7 to allow the user to input setting information regarding the part of the application programs to be executed by the engine CPU 3-7.

At S13, through the application setting screen, the user may determine the part of the application programs to be executed by the engine CPU 3-7 by inputting setting information regarding the part of the application programs to be executed by the engine CPU 3-7.

When the information regarding the setting of the part of the application programs is received through the operation device 1-7, at S14, the system CPU 3-9 stores the obtained setting information such as application identification information identifying the part of the application programs to be executed by the engine CPU 3-7 in the parameter memory 1-3 and the parameter memory 1-11, for example, as described above. When the setting information is stored, the image forming apparatus 1 causes the part of the application programs to be executed by the engine CPU 3-7 according to the setting information.

At S15, when the setting is completed, the system CPU 3-9 switches the display of the operation device 1-7 to a waiting screen, and the operation ends.

The operation of setting the part of the application programs to be executed by the engine CPU 3-7 may be performed in various other ways. For example, the user instruction may be received through the network such as the LAN by the external I/F 1-8.

Alternatively, at S12, the system CPU 3-9 may obtain the usage information such as the counter data or the history data from the parameter memory 1-3 or 1-11 for display to the service engineer or the user. Using such information, the service engineer or the user may determine the part of the application programs to be executed by the engine CPU 3-7. For example, the system CPU 3-7 may report the user with information indicating the part of the application programs, which provides the most frequently used image processing function, using the usage information stored in the parameter memory 1-3 or 1-11. With this information, the user may determine the part of the application programs to be executed by the engine CPU 3-7. In another example, the system CPU 3-7 may report the user with information indicating the part of the application programs, which provides the most frequently used image processing function firstly after the power of the image forming apparatus 1 is turned on, using the usage information stored in the parameter memory 1-3 or 1-11. With this information, the user may determine the part of the application programs to be executed by the engine CPU 3-7.

Referring to FIG. 6, the part of the application programs to be executed by the engine CPU 3-7 is set by a person through the application setting screen displayed on the operation device 1-7. Alternatively, the image forming apparatus 1 may automatically determine the part of the application programs using the usage information stored in the parameter memory 1-3 or 1-11 such as the counter data or the history data. For example, based on the usage information stored in the parameter memory 1-3 or 1-11, the system CPU 3-9 may specify which part of the application programs controls the most frequently performed image processing function, and causes the engine CPU 3-7 to execute the specified part of the application programs. In another example, based on the usage information stored in the parameter memory 1-3 or 1-22, the system CPU 3-9 may specify which part of the application programs controls the image processing function that is most frequently performed firstly after turning on of the image forming apparatus 1, and causes the engine CPU 3-7 to execute the specified part of the application programs.

<Processing Performed Between the Engine CPU and the System CPU>

Figure 7:
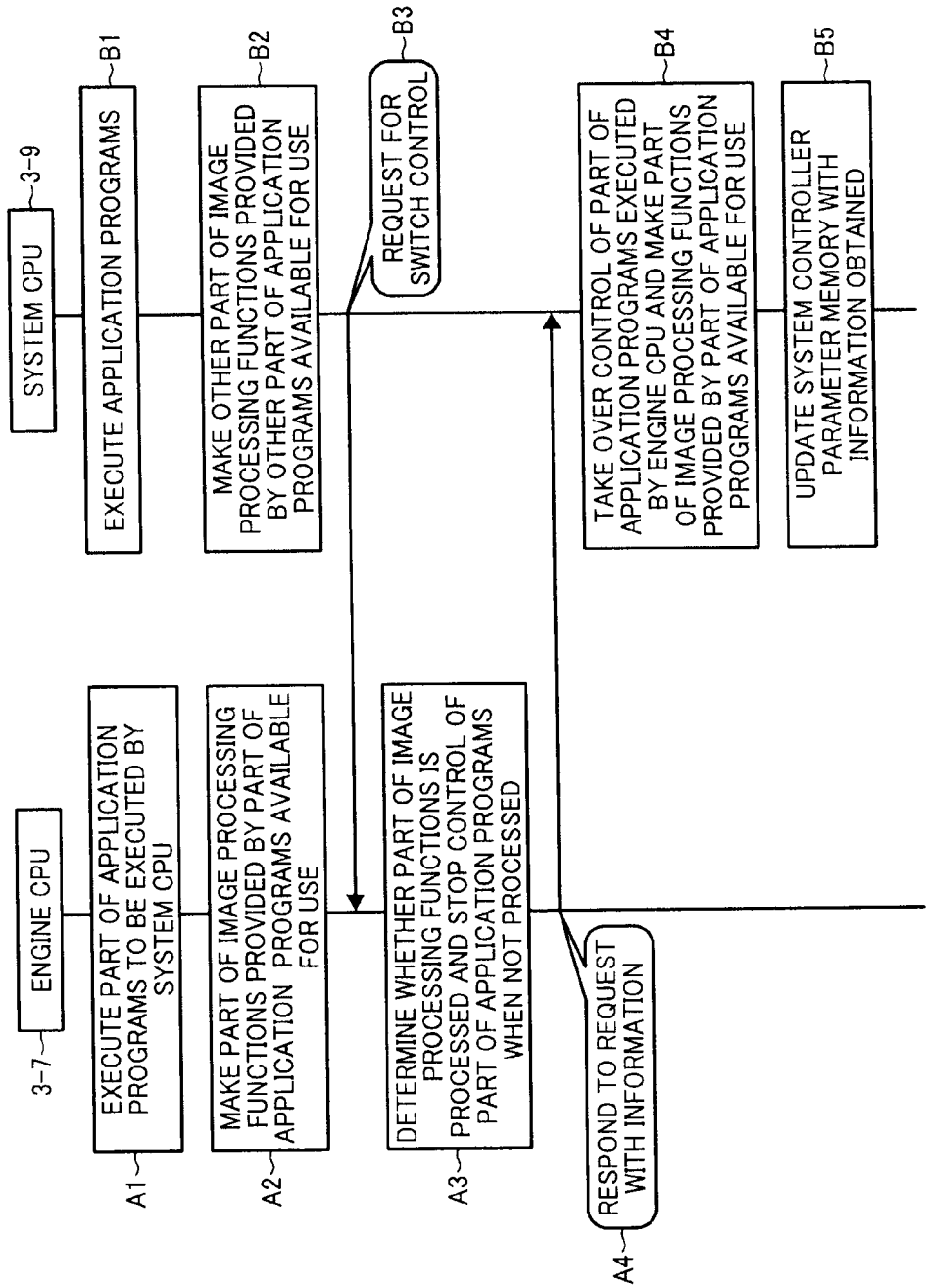
FIG. 7 is a data sequence diagram illustrating operation of starting up the image forming apparatus of FIG. 1 after the power is turned on, performed respectively by the engine CPU and the system CPU, according to an example embodiment of the present invention.

Referring to FIG. 7, operation of starting up the image forming apparatus 1, performed by the engine CPU 3-7 and the system CPU 3-9, is explained.

When the power of the image forming apparatus 1 is turned on, the engine CPU 3-7 loads the boot program from the ROM of the engine controller memory 1-2, and executes the boot program that is loaded. When execution of the boot program has completed, the engine CPU 3-7 loads the initial setting data from the engine controller parameter memory 1-3. The engine CPU 3-7 loads the image fixing operation program and the engine program from the ROM of the engine controller memory 1-2, and executes the image fixing operation program and the engine program.

At A1, the engine CPU 3-7 accesses the system controller memory 1-10 using the application identification information obtained from the initial setting data, and loads the part of the application programs that corresponds to the application identification information from the ROM of the system controller memory 1-10 to execute the loaded part of the application programs.

When execution of the image fixing operation program and the engine program are respectively completed, the engine CPU 3-7 controls initial settings of the image forming apparatus 1 based on the initial setting data including the registration adjust information, the distributed area information, and the language information. Examples of the initial setting operation include, but not limited to, controlling of a driving operation performed by a driving unit, an image reading operation performed by the image reading unit 1-5, an image forming operation performed by the image forming unit 1-6, and operating operation performed by the operation unit 1-7. When the initial setting operation has completed, at least a part of the image processing functions of copying, scanning, faxing, data communication, and printing may be made available for use by the user.

At B1, when the power of the image forming apparatus 1 is turned on, the system CPU 3-9 loads the boot program from the ROM of the system controller memory 1-10, and executes the boot program that is loaded. When execution of the boot program completes, the system CPU 3-9 loads the initial setting data stored in the system controller parameter memory 1-11. The system CPU 3-9 loads the application programs that correspond to the application identification information obtained from the initial setting data from the ROM of the system controller memory 1-10, and executes the loaded application programs. More specifically, in this example, the system CPU 3-9 executes the application programs using the application identification information for identifying the part of the application programs to be executed by the engine CPU 3-7 and the application identification information for identifying the application programs to be executed by the system CPU 3-9.

At A2, when execution of the application programs loaded from the ROM of the system controller memory 1-10 completes, the engine CPU 3-7 causes the part of the image processing functions that is provided by the part of the application programs that is executed to be available for use by the user. More specifically, the engine CPU 3-7 allows the user to firstly use the part of the image processing functions when the power is turned on. The engine CPU 3-7 may notify the user regarding the availability of the part of the image processing functions, for example, through the operation device 1-7 in the form of text information or voice information.

When the engine CPU 3-7 receives a request for performing the part of the image processing functions after A2, the image forming apparatus 1 performs the requested job. In such case, the engine CPU 3-7 updates the usage information such as the counter data or the history data in the engine controller parameter memory 1-3 with usage information regarding the requested job. The engine CPU 3-7 manages the usage information regarding the job that may be performed under control of the engine CPU 3-7 using the engine controller parameter memory 1-3.

At B2, when execution of the application programs loaded from the ROM of the system controller memory 1-10 has completed, the system CPU 3-9 allows the other part of the image processing functions, which is the part other than the part of the image processing functions of the plurality of image processing functions executed by the engine CPU 3-7 to be available for use by the user. The other part of the image processing functions can be identified by using the application identification information for identifying the part of the application programs executed by the engine CPU 3-7, and the application identification information for identifying the application programs to be executed by the system CPU 3-9.

At B3, the system CPU 3-9 sends a request for switch control to the engine CPU 3-7, which requests the control of the part of the application programs executed by the engine CPU 3-7 to be switched from the engine CPU 3-7 to the system CPU 3-9.

At A3, when the request for switch control is received from the system CPU 3-9, the engine CPU 3-7 determines whether any job that is performed by the part of the application programs executed by the CPU 3-7 is being processed. When it is determined that no job that is performed by the part of the application programs executed by the CPU 3-7 is being processed, the engine CPU 3-7 stops controlling the part of the application programs executed by the engine CPU 3-7.

At A4, the engine CPU 3-7 sends a response to the system CPU 3-9, in response to the request for switch control. With the response, the engine CPU 3-7 sends the usage information such as the counter data or the history data stored in the engine controller parameter memory 1-3 to the system CPU 3-9. As described above, the usage information reflects the image processing job that is performed by the part of the application programs executed by the engine CPU 3-7 under control of the engine CPU 3-7.

At B4, when the response to the request for switch control is received from the engine CPU 3-7, the system CPU 3-9 determines that the engine CPU 3-7 stops controlling the part of the application programs executed by the engine CPU 3-7, and takes over control of the part of the application programs executed by the engine CPU 3-7. The system CPU 3-9 allows the part of the application programs executed by the engine CPU 3-7, which took over control from the engine CPU 3-7, to be available for use by the user. In this manner, the system CPU 3-9 controls the plurality of application programs including the part of the application programs executed by the engine CPU 3-7.

Further, at B5, the system CPU 3-9 receives the usage information such as the counter data or the history data from the engine CPU 3-7, and updates the usage information such as the counter data or the history data stored in the system controller parameter memory 1-11 with the obtained usage information.

For example, when the system CPU 3-9 receives the usage information such as the counter data or the history data from the engine CPU 3-7, the system CPU 3-9 obtains usage information stored in the system controller parameter memory 1-11 for the part of the image processing functions that is executed by the engine CPU 3-7. The system CPU 3-9 compares the usage information obtained from the system controller parameter memory 1-11 with the usage information just obtained from the engine CPU 3-7 to obtain difference usage information indicating the difference between the previously stored usage information and the just obtained usage information. Once the difference usage information is obtained, the system CPU 3-9 updates the usage information for all image processing functions that is stored in the system controller parameter memory 1-11, with the difference information obtained for the part of the application programs executed by the engine CPU 3-7.

In the above-described example, the engine CPU 3-7 may only send the usage information regarding a specific application program of the part of the application programs when the job only relates to a specific image processing function performed by the specific application program. In such case, the system CPU 3-9 may obtain usage information for the specific application program from the system controller parameter memory 1-11 for comparison.

With the above-described function, the system CPU 3-9 is able to manage the usage information for each of the plurality of application programs or the image processing functions, even when the image processing job is performed by the part of the application programs under control of the engine CPU 3-7.

As described above, the engine CPU 3-7 sends the usage information stored in the engine controller parameter memory 1-3 to the system CPU 3-9 after control of the part of the application programs executed by the engine CPU 3-7 is stopped to cause the system CPU 3-9 to update the usage information stored in the system controller parameter memory 1-11. Alternatively, the engine CPU 3-7 may send the usage information stored in the engine controller parameter memory 1-3 to the system CPU 3-9 when the image forming apparatus 1 is in the waiting state to the system CPU 3-9 to cause the system CPU 3-9 to update the usage information stored in the system controller parameter memory 1-11. For example, the engine CPU 3-7 may determine that the image forming apparatus 1 is in the waiting state when no image processing job is performed under control of the engine CPU 3-7, even when control of the engine CPU 3-7 is not stopped.

In the above described example, the engine controller parameter memory 1-3 and the system controller parameter memory 1-11 are used to manage the usage information such as the counter data or the history data of the image processing functions or the application programs provided by the image forming apparatus 1. Alternatively, the image forming apparatus 1 may be provided with a parameter memory, which is accessible from any one of the engine CPU 3-7 and the system CPU 3-9, to manage the usage information. In such case, any one of the engine CPU 3-7 and the system CPU 3-9 is able to update the usage information.

In the above-described example referring to FIG. 7, at B3, when execution of the application programs has completed, the system CPU 3-9 sends the request for switch control to the engine CPU 3-7. When the request for switch control is received, the engine CPU 3-7 stops control of the part of the application programs executed by the engine CPU 3-7 at A3, and sends the response to the system CPU 3-9 in response to the request for switch control at A4. At B4, when the response is received from the engine CPU 3-7, the system CPU 3-9 takes over the control of the part of the application programs executed by the engine CPU 3-7 from the engine CUP 3-7 to control all of the application programs including the part of the application programs executed by the engine CPU 3-7.

Figure 8:
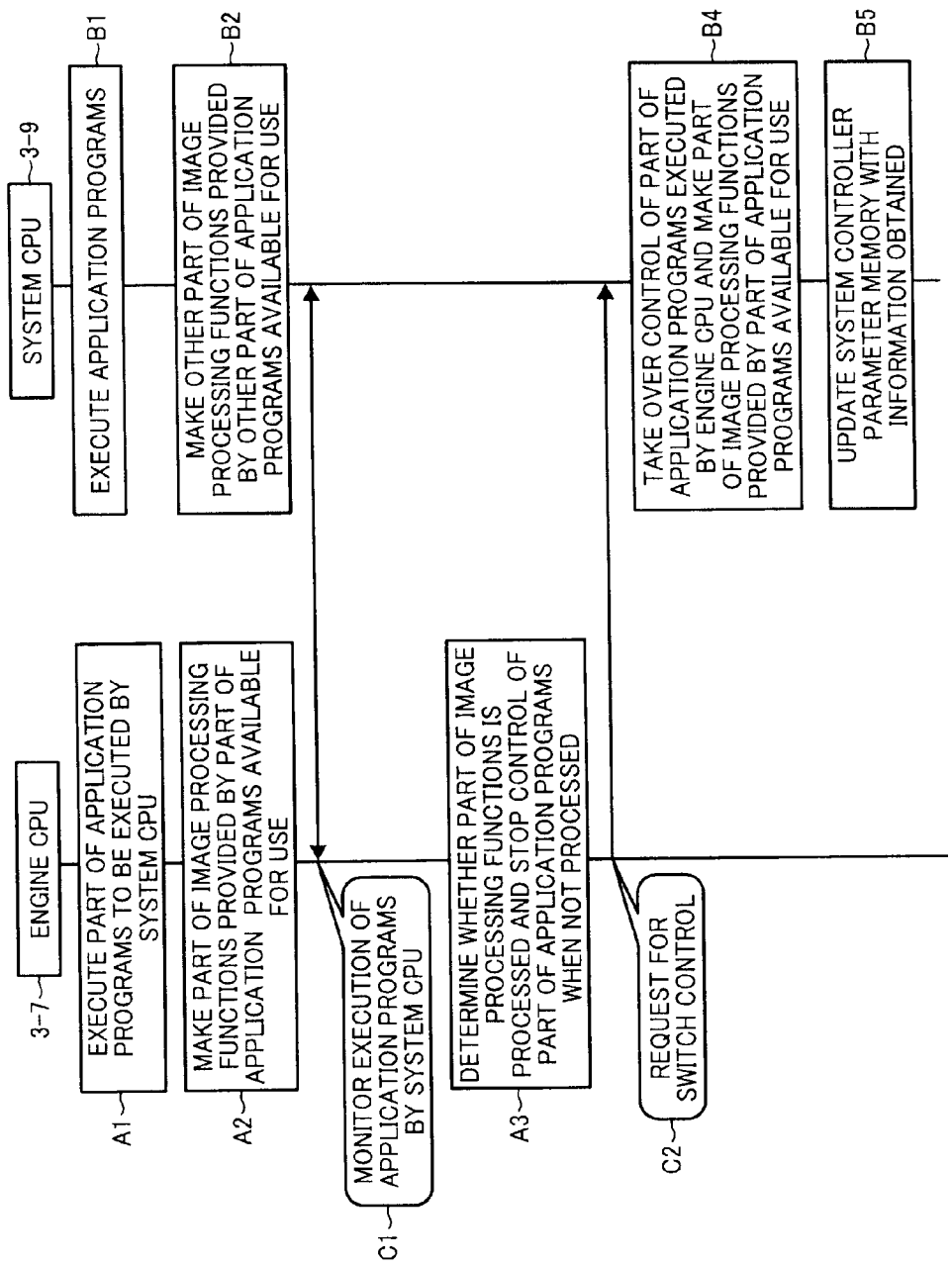
FIG. 8 is a data sequence diagram illustrating operation of starting up the image forming apparatus of FIG. 1 after the power is turned on, performed respectively by the engine CPU and the system CPU, according to an example embodiment of the present invention.

Alternatively, the method of switching the control of the part of the application programs executed by the engine CPU 3-7 is not limited to the above-described example, for example, as illustrated in FIG. 8. The operation illustrated in FIG. 8 is substantially similar to the operation of FIG. 7. The differences include the replacement of B3 and A4, with C1 and C2.

At C1, when the part of the application programs has been executed by the engine CPU 3-7, the engine CPU 3-7 starts monitoring the system CPU 3-9 to determine whether the execution of the application programs by the system CPU 3-9 has completed. When it is determined that the execution of the application programs by the system CPU 3-9 has completed, the engine CPU 3-7 determines whether there is any image processing job is being performed by the part of the application programs executed by the engine CPU 3-7. When it is determined that the execution of the application programs by the system CPU 3-9 has completed, and when no image processing job is being performed, at A3, the engine CPU 3-7 stops control of the part of the application programs executed by the CPU 3-7.

At C2, the engine CPU 3-7 sends a request for switch control to the system CPU 3-9, which requests the system CUP 3-9 to take control of the part of the application programs executed by the engine CPU 3-7. When the request for switch control is received, the system CPU 3-9 takes over the control of the part of the application programs executed by the engine CPU 3-7 from the engine CPU 3-7, and controls the plurality of application programs including the part of the application programs executed by the engine CPU 3-7.

The operation performed by the image forming apparatus 1, which is described above referring to FIGS. 1 to 8, may be performed in various other ways.

For example, as described above referring to FIGS. 1 to 8, the engine CPU 3-7 accesses the system controller memory 1-10 to obtain the part of the application programs using the application identification information stored in the engine controller parameter memory 1-3, and loads the obtained part of the application programs from the ROM of the system controller memory 1-10 for execution. Alternatively, the part of the application programs to be executed by the engine CPU 3-7 may be previously stored in the ROM of the engine controller memory 1-2. In such case, the engine CPU 3-7 loads the part of the application programs stored in the ROM of the engine controller memory 1-2, and executes the loaded part of the application programs. In this manner, the engine CPU 3-7 does not have to access the system controller memory 1-10 to obtain the part of the application programs to be executed by the engine CPU 3-7. Since accessing the system controller memory 1-10, which is controlled by the system CPU 3-9, is not required, the time required for executing the part of the application programs by the engine CPU 3-7 may be further reduced, thus reducing the time for requiring the user to wait after the power of the image forming apparatus 1 is turned on.

In order to operate as described above, the engine controller memory 1-2 of the image forming apparatus 1 of FIG. 1 previously stores the part of the application programs to be executed by the engine CPU 3-7 in the ROM at any desired time. In one example, the part of the application programs may be stored in the ROM of the engine controller memory 1-2 when the service engineer or the user has set the selection of the part of the application programs as described above referring to FIG. 6.

Figure 9:
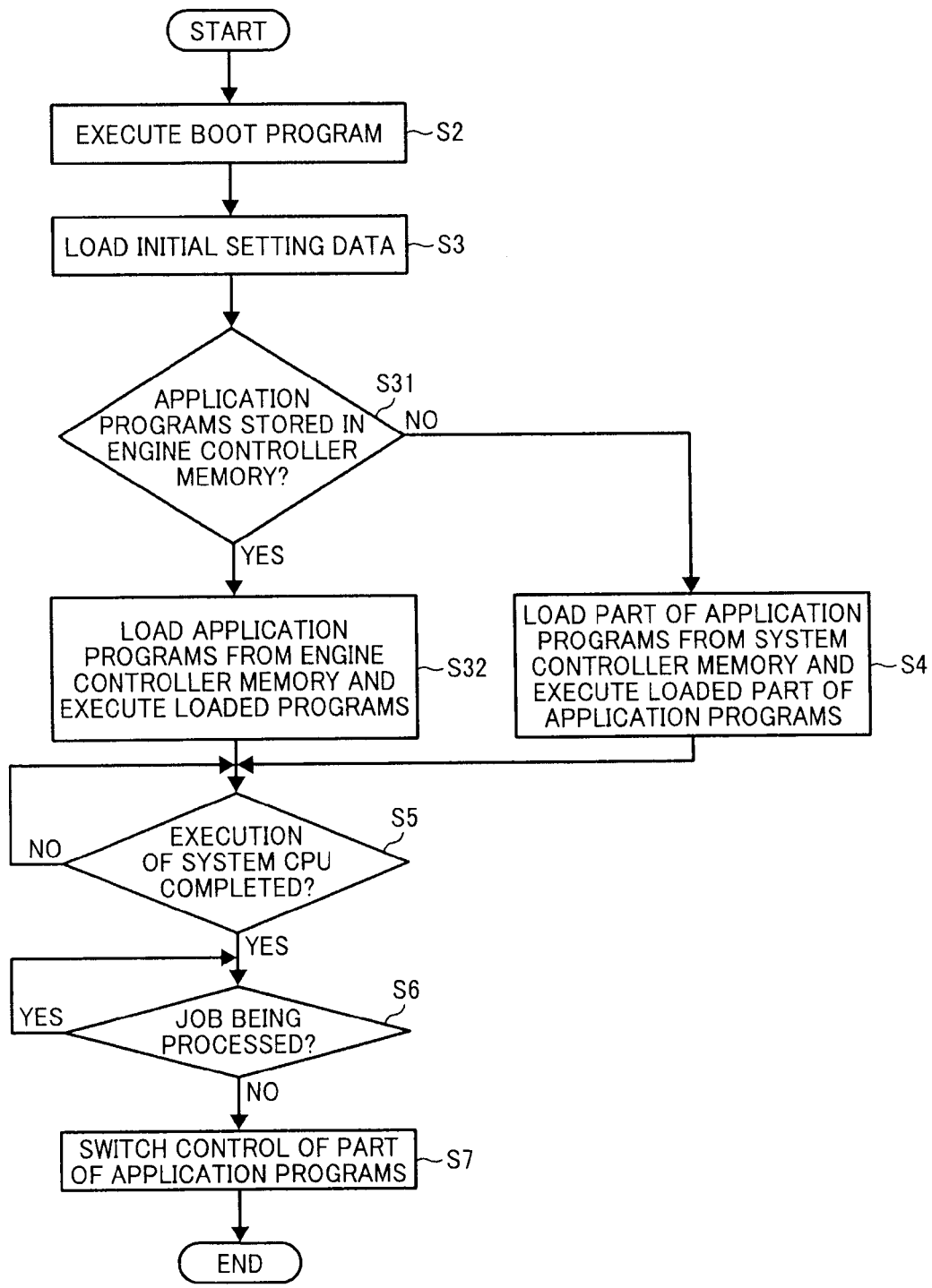
FIG. 9 is a flowchart illustrating operation of starting up the image forming apparatus of FIG. 1 after the power is turned on, performed by the engine CPU of the image forming apparatus of FIG. 1, according to an example embodiment of the present invention.

Referring now to FIG. 9, operation of staring up the image forming apparatus 1, performed by the engine CPU 3-7, is explained according to an example embodiment of the present invention.

At S2, when the power of the image forming apparatus 1 is turned on, the engine CPU 3-7 loads the boot program from the ROM of the engine controller memory 1-2, and executes the boot program.

When execution of the boot program completes, at S3, the engine CPU 3-7 loads the initial setting data stored in the engine controller parameter memory 1-3. The engine CPU 3-7 further loads the image fixing operation program and the engine program from the ROM of the engine controller memory 1-2, and executes the image fixing operation program and the engine program that are loaded.

At S31, the engine CPU 3-7 determines whether the part of the application programs to be executed by the engine CPU 3-7 is stored in the ROM of the engine controller memory 1-2. When it is determined that the part of the application programs to be executed by the engine CPU 3-7 is stored ("YES" at S31), the operation proceeds to S32. When it is determined that the part of the application programs to be executed by the engine CPU 3-7 is not stored ("NO" at S31), the operation proceeds to S4. For example, the engine CPU 3-7 may obtain the application identification information from the initial setting data, and searches the ROM of the engine controller memory 1-2 for the part of the application programs, such as one or more application programs, that corresponds to the application identification information.

At S32, the engine CPU 3-7 loads the part of the application programs from the ROM of the engine controller memory 1-2 using the application identification information, and executes the part of the application programs that is loaded.

At S4, the engine CPU 3-7 accesses the system controller memory 1-10 to load the application program that corresponds to the application identification information from the ROM of the system controller memory 1-10. The engine CPU 3-7 executes the application program that is loaded from the ROM of the system controller memory 1-10.

Further, when the image fixing operation program and the engine program are each executed, the engine CPU 3-7 controls initial setting of the image forming apparatus 1 according to the registration adjust information, distributed area information, and language information, each included in the initial setting data. Examples of the initial setting operation include, but not limited to, controlling of a driving operation performed by a driving unit, an image reading operation performed by the image reading unit 1-5, an image forming operation performed by the image forming unit 1-6, and operating operation performed by the operation unit 1-7. When the initial setting operation has completed, at least a part of the image processing functions of copying, scanning, faxing, data communication, and printing may be made available for use by the user.

S5 to S7 may each be performed in a substantially similar manner as described above referring to S5 to S7 of FIG. 5.

As described above referring to FIG. 9, the engine CPU 3-7 loads the part of the application programs that is stored in the ROM of the engine controller memory 1-2 under control of the engine CPU 3-7 for execution, when the part of the application programs is stored in the ROM of the engine controller memory 1-2. With this function, execution of the part of the application programs by the engine CPU 3-7 may be performed more efficiently, thus reducing the time required for making the part of the image processing functions provided by the part of the application programs executed by the engine CPU 3-7 to be available for use by the user.

In the above-described example illustrated in FIG. 9, when the part of the application programs to be executed by the engine CPU 3-7 is not stored in the ROM of the engine controller memory 1-2, the engine CPU 3-7 loads the part of the application programs to be executed by the engine CPU 3-7 from the ROM of the system controller memory 1-20 using the application identification information. Additionally, the CPU 3-7 may store the part of the application programs to be executed by the engine CPU 3-7 onto the ROM of the engine controller memory 1-2, once the part of the application programs to be executed by the engine CPU 3-7 is obtained from the ROM of the system controller memory 1-10. Once the part of the application programs to be executed by the engine CPU 3-7 has been stored, the engine CPU 3-7 is able to load the part of the application programs to be executed by the engine CPU 3-7 from the ROM of the engine controller memory 1-2 next time when the power of the image forming apparatus 1 is turned on.

Further, before storing the part of the application programs to be executed by the engine CPU 3-7 onto the ROM of the engine controller memory 1-2, the image forming apparatus 1 may ask the user whether to store the part of the application programs onto the ROM of the engine controller memory 1-2 through the operation unit 1-7. When a user instruction for storing the part of the application programs is received, the image forming apparatus 1 may cause the part of the application programs to be stored in the ROM of the engine controller memory 1-2. The part of the application programs to be executed by the engine CPU 3-7 may be stored in any desired form including, for example, in the form of raw data or compressed data as described above.

Alternatively, when the part of the application programs to be executed by the engine CPU 3-7 is not stored in the ROM of the engine controller memory 1-2, but stored in the ROM of the system controller memory 1-10 in the compressed format, the engine CPU 3-7 may expand the part of the application programs in the compressed format onto the RAM of the engine controller memory 1-2, and store the part of the application programs in the ROM of the engine controller memory 1-2 in the uncompressed format.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, in the above-described example, the part of the application programs, which is to be executed first at the time of starting up the image forming apparatus 1, is executed by the engine CPU 3-7. Alternatively, any CPU other than the engine CPU 3-7 may perform such function or operation. For example, a sub CPU may be provided. However, by causing the engine CPU 3-7, which is usually present in an image forming apparatus, to be able to execute the part of the application programs at the time of starting up, no additional structural change is required, thus reducing the implementation cost.

Further, any one of the above-described and other methods of the present invention does not have to be performed sequentially. For example, according to the capability of the image forming apparatus 1 or any apparatus capable of performing the above-described method, the above-described operation may be concurrently performed at least partially.

Any one of the above-described and other methods of the present invention may be performed by any number of hardware devices or any number of software components, or any combination of hardware devices and the software components. Further, the above-described operation may be performed by any desired image processing apparatus capable of performing a plurality of image processing functions, or any desired image processing system capable of performing a plurality of image processing functions.

For example, as described above, any one of the above-described and other methods of the present invention may be embodied in the form of a computer program stored in any kind of storage medium, at least temporarily. Examples of storage mediums include, but are not limited to, flexible disk, hard disk, optical discs such as CD-ROM or DVD, magneto-optical discs, magnetic tapes or disks, involatile memory cards, ROM (read-only-memory), hard disk drive, semiconductor memory, etc. The storage medium, which may be removable, may be distributed as package software.

The above-described computer program stored in any storage medium may be installed onto any desired computer, which causes the computer to function as a specially programmed image processing apparatus capable of performing the functions as described above referring to FIGS. 1 to 9. Alternatively, the computer program, which may be stored in any storage device, may be distributed through a network of any desired type including wired or wireless, to cause any desired computer to function as a specifically programmed image processing apparatus capable of performing the functions as described above referring to FIGS. 1 to 9.

Alternatively, the computer program storing therein a plurality of processing sequences may be installed onto an internal memory of a computer having a specialized hardware device, or onto an internal memory of a general-purpose computer.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an image forming apparatus capable of providing a plurality of image processing functions, the apparatus including: a first controller memory configured to store a plurality of application programs each providing at least a part of the plurality of image processing functions of the image forming apparatus; a first controller configured to execute and control the plurality of application programs stored in the first controller memory; and a second controller configured to execute and control a preparatory operation program to control a preparatory operation which causes a part of the plurality of image processing functions to be available for use. When the power of the image forming apparatus is turned on, the second controller is configured to complete the execution of a part of the plurality of application programs before the execution of the plurality of application programs by the first controller completes, and to control the part of the plurality of application programs to cause a part of the image processing functions provided by the part of the application programs executed by the first controller to be available for use by a user.

In the above-described example, when the execution of the plurality of application programs by the first controller completes, the first controller is configured to take over the control of the part of the plurality of application programs from the second controller to control the plurality of application programs including the part of the application programs executed by the second controller.

In the above-described example, when the execution of the plurality of application programs by the first controller completes, the second controller is configured to determine whether an image processing job is being performed by the part of the plurality of application programs executed by the second controller to generate a determination result, and to cause the first controller to take over the control of the part of the plurality of application programs from the second controller when the determination result indicates that the image processing job is not being performed.

In the above-described example, when the execution of the plurality of application programs by the first controller completes, the first controller sends a request for switch control to the second controller, which requests the second controller to allow the first controller to take over the control of the part of the plurality of application programs, and the second controller is configured to stop the control of the part of the application programs and to send a response to the first controller, which allows the second controller to take over the control of the part of the plurality of application programs.

In the above-described example, the second controller is configured to monitor the first controller to determine whether the execution of the plurality of application programs by the first controller completes, and to send a request for switch control to the first controller, which requests the first controller to take over the control of the part of the plurality of application programs, when the second controller determines that the execution of the plurality of application programs by the first controller completes, and the first controller is configured to take over the control of the part of the plurality of application programs when the request for switch control is received from the second controller.

In the above-described example, when the image processing job is being performed by the part of the plurality of application programs executed by the second controller, the second controller stops the control of the part of the plurality of application programs executed by the second controller after completion of the image processing job.

In the above-described example, the image forming apparatus further includes a parameter memory configured to store application identification information, which is used to identify the part of the plurality of application programs to be executed by the second controller. The second controller is configured to obtain the part of the plurality of application programs from the first controller memory using the application identification information stored in the parameter memory for execution.

In the above-described example, the image forming apparatus includes a second controller memory controlled by the second controller. When the second controller determines that the part of the plurality of application programs to be executed by the second controller is stored in the second controller memory, the second controller is configured to obtain the part of the plurality of application programs to be executed by the second controller from the second controller memory for execution. When the second controller determines that the part of the plurality of application programs to be executed by the second controller is not stored in the second controller memory, the second controller is configured to obtain the part of the plurality of application programs to be executed by the second controller from the first controller memory for execution using the application identification information.

What is claimed is:

1. An image processing apparatus capable of providing a plurality of image processing functions, the apparatus comprising:

a first controller memory configured to store a plurality of application programs each providing at least a part of the plurality of image processing functions of the image processing apparatus;

a first controller configured to control the first controller memory and to execute and control the plurality of application programs stored in the first controller memory; and a second controller configured to execute and control a part of the plurality of application programs which is previously selected from the plurality of application programs stored in the first controller memory, wherein when the power of the image processing apparatus is turned on, the second controller is configured to complete the execution of the part of the plurality of application programs before the execution of the plurality of application programs by the first controller completes, and to cause a part of the plurality of image processing functions provided by the part of the application programs executed by the second controller to be available for use by a user before the plurality of image processing functions becomes available for use by the user, wherein the first controller and the second controller concurrently execute different parts of the plurality of the application programs.

2. The apparatus of claim 1, wherein the second controller includes:

an engine controller configured to execute and control a preparatory operation program that controls a preparatory operation which causes the part of the plurality of image processing functions to be available for use by the user, wherein the second controller is configured to cause the part of the plurality of image processing functions to be available for use by the user when the execution of the part of the plurality of application programs and the execution of the preparatory operation program are respectively completed by the second controller.

3. The apparatus of claim 2, further comprising:

a parameter memory configured to store application identification information, which is used to identify the part of the plurality of application programs to be executed by the second controller, wherein when the power of the image forming apparatus is turned on, the second controller is configured to obtain the part of the plurality of application programs from the first controller memory using the application identification information obtained from the parameter memory, and to execute the part of the plurality of application programs that is obtained.

4. The apparatus of claim 3, further comprising:

a second controller memory controlled by the second controller, wherein when the power of the image forming apparatus is turned on, the second controller determines whether the part of the plurality of application programs to be executed by the second controller is stored in the second controller memory using the application identification information obtained from the parameter memory to generate a determination result, when the determination result indicates that the part of the plurality of application programs to be executed by the second controller is stored in the second controller memory, the second controller is configured to obtain the part of the plurality of application programs to be executed by the second controller from the second controller memory for execution, and when the determination result indicates that the part of the plurality of application programs to be executed by the second controller is not stored in the second controller memory, the second controller is configured to obtain the part of the plurality of application programs to be executed by the second controller from the first controller memory for execution, and to store the part of the application programs obtained from the first controller memory in the second controller memory.

5. The apparatus of claim 4, wherein:
the first controller memory is configured to store at least the part of the plurality of application programs to be executed by the second controller in a compressed format, and
when the second controller obtains the part of the plurality of application programs from the first controller memory, the second controller is configured to expand the part of the application programs, and to store the part of the application programs in the second controller memory in an uncompressed format.

6. The apparatus of claim 4, wherein when the execution of the plurality of application programs by the first controller completes, the first controller is configured to firstly control the other part of the plurality of application programs other than the part of the plurality of application programs executed by the second controller, and to take over the control of the part of the plurality of application programs executed by the second controller from the second controller so as to control the plurality of application programs including the part of the application programs executed by the second controller.

7. The apparatus of claim 6, wherein when the execution of the plurality of application programs by the first controller completes, the second controller is configured to determine whether an image processing job is being performed by the part of the plurality of application programs executed by the second controller, and to stop the control of the part of the application programs to allow the first controller to take over the control of the part of the plurality of application programs from the second controller only when the image processing job is not being performed.

8. The apparatus of claim 7, further comprising:
a user interface configured to notify the user when the part of the image processing functions provided by the part of the application programs executed by the second controller is available for use, and to receive a user instruction for performing the image processing job using the part of the application programs executed by the second controller, and
when the user instruction is received through the user interface, the second controller is configured to cause the part of the plurality of application programs to perform the part of the image processing functions, and to allow the first controller to take over the control of the part of the plurality of application programs from the second controller after the image processing job is performed.

9. The apparatus of claim 8, wherein:
the parameter memory is further configured to store usage information indicating the result of performing at least one of the plurality of image processing functions provided by the image processing apparatus, and
when the image processing job is performed by the part of the application programs executed by the second controller in response to the user instruction received through the user interface, the second controller is configured to cause the usage information stored in the parameter memory to be updated to reflect the result of performing the image processing job.

10. The apparatus of claim 9, wherein the parameter memory includes:
a first parameter memory controlled by the first controller and configured to store the usage information indicating the result of performing at least one of the plurality of image processing functions provided by the image processing apparatus for all of the plurality of image processing functions; and
a second parameter memory controlled by the second controller and configured to store usage information indicating the result of performing at least one of the part of the plurality of image processing functions provided by the part of the plurality of application programs executed by the second controller,
wherein, when the image processing job is performed by the part of the application programs executed by the second controller, the second controller is configured to cause the usage information stored in the second parameter memory to be updated to reflect the result of performing the image processing job, and to send the updated usage information obtained from the second parameter memory to the first controller after the image processing job is performed.

11. The apparatus of claim 9, wherein when the execution of the plurality of application programs by the first controller completes, the first controller sends a request for switch control to the second controller, which requests the second controller to allow the first controller to take over the control of the part of the plurality of application programs, and
the second controller is configured send a response to the first controller, which allows the first controller to take over the control of the part of the plurality of application programs from the second controller when the second controller stops the control of the part of the application programs.

12. The apparatus of claim 9, wherein the second controller is configured to monitor the first controller to determine whether the execution of the plurality of application programs by the first controller completes, and to send a request for switch control to the first controller, which requests the first controller to take over the control of the part of the plurality of application programs from the second controller, when the second controller determines that the execution of the plurality of application programs by the first controller completes, and
wherein the first controller is configured to take over the control of the part of the plurality of application programs from the second controller when the request for switch control is received from the second controller.

13. The apparatus of claim 9, wherein the usage information stored in the parameter memory includes used application information indicating the usage of each of the plurality of application programs stored in the first controller memory, and
the first controller is further configured to specify a most frequently used application from the plurality of application programs stored in the first controller memory using the used application information, and to select the most frequently used application to be the part of the plurality of application programs to be executed by the second controller.

14. The image processing apparatus of claim 1, wherein the image processing apparatus includes a photocopier including an image fixing device.

15. The image processing apparatus of claim 14, wherein the first controller includes a central processing unit (CPU) and controls operations of the photocopier.

16. The image processing apparatus of claim 1, wherein the second controller concurrently executes an image fixing operation program, an engine program, and the part of the plurality of application programs.

17. A method of controlling an image processing apparatus capable of providing a plurality of image processing functions, the method comprising:

providing a first controller memory to store a plurality of application programs each providing at least a part of the plurality of image processing functions of the image processing apparatus;

providing a first controller to control the first controller memory and to execute and control the plurality of application programs stored in the first controller memory;

providing a second controller to execute and control a part of the plurality of application programs which is previously selected from the plurality of application programs stored in the first controller memory;

causing the first controller to execute the plurality of application programs when the power of the image processing apparatus is turned on;

causing the second controller to complete the execution of the part of the plurality of application programs before the execution of the plurality of application programs by the first controller completes when the power of the image processing apparatus is turned on; and causing a part of the plurality of image processing functions provided by the part of the application programs executed by the second controller to be available for use by a user before the plurality of image processing functions becomes available for use by the user, wherein the first controller and the second controller concurrently execute different parts of the plurality of the application programs.

18. A non-transitory computer-readable storage medium having computer readable program codes embodied in the computer readable storage medium that, when executed cause a computer to execute a method of controlling an image processing apparatus capable of providing a plurality of image processing functions, the method comprising:

providing a first controller memory to store a plurality of application programs each providing at least a part of the plurality of image processing functions of the image processing apparatus;

providing a first controller to control the first controller memory and to execute and control the plurality of application programs stored in the first controller memory;

providing a second controller to execute and control a part of the plurality of application programs which is previously selected from the plurality of application programs stored in the first controller memory;

causing the first controller to execute the plurality of application programs when the power of the image processing apparatus is turned on;

causing the second controller to complete the execution of the part of the plurality of application programs before the execution of the plurality of application programs by the first controller completes when the power of the image processing apparatus is turned on; and causing a part of the plurality of image processing functions provided by the part of the application programs executed by the second controller to be available for use by a user before the plurality of image processing functions becomes available for use by the user, wherein the first controller and the second controller concurrently execute different parts of the plurality of the application programs.

19. An image processing apparatus capable of providing a plurality of image processing functions, the apparatus comprising:

a photocopier including an image fixing device;

a first controller memory configured to store a plurality of application programs each providing at least a part of the plurality of image processing functions of the image processing apparatus;

a first controller configured to control the first controller memory and to execute and control the plurality of application programs stored in the first controller memory; and a second controller configured to execute and control a part of the plurality of application programs which is previously selected from the plurality of application programs stored in the first controller memory, wherein when the power of the image processing apparatus is turned on, the second controller is configured to complete the execution of the part of the plurality of application programs before the execution of the plurality of application programs by the first controller completes, and to cause a part of the plurality of image processing functions provided by the part of the application programs executed by the second controller to be available for use by a user before the plurality of image processing functions becomes available for use by the user.

* * * * *